(12) United States Patent
Sasaki

(10) Patent No.: US 7,309,725 B2
(45) Date of Patent: Dec. 18, 2007

(54) FIBER BASE MATERIAL FOR WET FRICTION MATERIAL

(75) Inventor: Kazuhiro Sasaki, Okayama (JP)

(73) Assignee: Japan Exlan Company Limited, Osaka (JP)

( * ) Notice: Subject to any disclaimer, the term of this patent is extended or adjusted under 35 U.S.C. 154(b) by 482 days.

(21) Appl. No.: 10/483,247

(22) PCT Filed: Jul. 15, 2002

(86) PCT No.: PCT/JP02/07201

§ 371 (c)(1),
(2), (4) Date: Jan. 9, 2004

(87) PCT Pub. No.: WO03/014589

PCT Pub. Date: Feb. 20, 2003

(65) Prior Publication Data

US 2004/0198866 A1    Oct. 7, 2004

(30) Foreign Application Priority Data

Aug. 3, 2001    (JP)    ............................. 2001-236435

(51) Int. Cl.
C08J 5/14    (2006.01)
(52) U.S. Cl. ...................................... 523/149; 523/152
(58) Field of Classification Search ................ 523/149, 523/152
See application file for complete search history.

(56) References Cited

U.S. PATENT DOCUMENTS 4,446,206 A *    5/1984    Fester et al. ................. 428/364
5,145,888 A *    9/1992    Gong et al. .................. 523/156
5,472,995 A    12/1995    Kaminski et al.
5,520,866 A    5/1996    Kaminski et al.
6,110,991 A    8/2000    Kaminski et al.

FOREIGN PATENT DOCUMENTS

| JP | 61-120795 | 7/1986 |
|---|---|---|
| JP | 1-104818 | 4/1989 |
| JP | 5-45808 | 7/1993 |
| JP | 7-37606 | 4/1995 |
| JP | 8-217888 | 8/1996 |
| JP | 2000-226723 | 8/2000 |
| JP | 2001-55620 | 2/2001 |

* cited by examiner

Primary Examiner—Kriellion A Sanders
(74) Attorney, Agent, or Firm—Wenderoth, Lind & Ponack, L.L.P.

(57) ABSTRACT

A fibrous base material giving a wet frictional material used for clutch, differential gear, brake, etc. of cars, industrial machines, etc. having an excellent durability where plastic deformation of fiber and deterioration by acidic decomposition products of lubricant additives do not take place is provided. A fibrous base material for wet frictional materials which comprises a fiber component, a friction adjusting material and a filler, said fiber component containing 5 to 50% by weight of a homoacrylonitrile fiber where modulus of elasticity at 180° C. is not less than 10 cN/dtex and shrinking rate at 200° C. is within 5% and/or a homoacrylonitrile fiber in a pulp form prepared by fibrillation of said homoacrylonitrile fiber.

4 Claims, No Drawings

FIBER BASE MATERIAL FOR WET FRICTION MATERIAL

TECHNICAL FIELD

The present invention relates to a fibrous base material for wet frictional materials which is a fibrous base material useful for the formation of wet frictional material used for clutch, differential gear, brake, etc. of automobiles, cars, industrial machines, etc. and is particularly excellent for its durability.

BACKGROUND OF THE INVENTION

A wet frictional material which functions in lubricant having both effects of cooling and lubrication is used in automatic transmission for automobiles, differential gear for four-wheel-drive vehicles, wet brake of tightly closed type, etc. With regard to an organic fiber material for the wet frictional material, there have been used acrylic fiber and fibrillated acrylic fiber which are less expensive as compared with aramid pulp and have excellent adhesive property to a bonding material where improvement in strength of the wet frictional material can be attempted and an appropriate porosity is achieved. For example, in an invention of the Japanese patent publication No. 05/45,808 B, there is proposed a wet frictional material where fibrillated acrylic fiber in an amount of 5 to 50% byweight to the total fiber is used and, in the Japanese patent publication No. 07/37,606 B, there is proposed a wet frictional material using a fiber base material by the joint use of acrylic pulp and aramid pulp. However, as a result of an increase in generating power of car engine and tendency of making efficiency and size of automatic transmission higher and smaller in recent years, sliding speed increases and load upon engagement becomes high resulting in high temperature of the wet frictional material whereupon durability of the wet frictional material has become a problem.

Thus, when acrylic fiber and fibrillated acrylic fiber which have been used as fibrous base materials for wet frictional materials are subjected to stress such as sliding and compression for a long period in a wet frictional material of high temperature, there is a disadvantage that elastic modulus extremely lowers and fiber is plastically deformed. As a result thereof, the wet frictional material is deteriorated, pores formed among the fibers are crushed and appropriate oil membrane is not prepared whereupon there is a problem that frictional characteristic lowers and that, finally, burning is resulted. Usually, a sulfur compound such as calcium sulfonate or zinc dialkyldithiophosphate is added to a lubricant as a cleansing dispersing agent and an anti-abrasion agent but such a compound produces acidic decomposition products by heat. They accelerate deterioration of not only jointly used cellulose pulp but also acrylic fiber and fibrillated acrylic fiber used conventionally for the wet frictional material whereupon durability lowers and that is another problem.

OBJECT OF THE INVENTION

An object of the present invention is to provide a fibrous base material giving a wet frictional material particularly used for clutch, differential gear, brake, etc. of cars, industrial machines, etc. having an excellent durability where plastic deformation of fiber and deterioration by acidic decomposition products of lubricant additives do not take place.

SUMMARY OF THE INVENTION

It has been found that, according to the present invention, the above-mentioned problem can be solved by the use of a homoacrylonitrile fiber which keeps a certain modulus of elasticity in a frictional material of high temperature and has little thermal shrinkage. Thus, the present invention relates to a fibrous base material for wet frictional materials which comprises a fiber component, a friction adjusting material and a filler, said fiber component containing 5 to 50% by weight of ahomoacrylonitrile fiber where modulus of elasticity at 180° C. is not less than 10 cN/dtex and shrinking rate at 200° C. is within 5% (hereinafter, may be referred to as "homoacrylic fiber") and/or a homoacrylonitrile fiber in a pulp form prepared by fibrillation of the homoacrylonitrile fiber (hereinafter, may be referred to as "homoacrylic pulp"). Incidentally, in the fibrous base material of the present invention for wet frictional materials, ratio by weight of the homoacrylic fiber to the homoacrylic pulp is from 50/50 to 10/90 and the homoacrylic fiber is a fiber which is subjected to a crimping treatment followed by cutting into 0.5 to 4 mm (hereinafter, may be referred to as "curved homoacrylic short fiber") and, as a result thereof, an object of the invention is able to be more highly achieved.

DETAILED DESCRIPTION OF THE INVENTION

As hereunder, the present invention will be illustrated in detail. A polymer which is a starting material for the homoacrylic fiber and/or the homoacrylic pulp adopted by the present invention is a homopolymer in which only acrylonitrile monomer is used as a type of a polymerizing monomer. In the so-called acrylic fiber using another type of monomer as a copolymerizing monomer (hereinafter, referred to as "copolymer acrylic fiber"), crystallinity of the copolymer is disordered and, even when any spinning means for improving the crystallinity as mentioned hereinafter is adopted, degree of crystallization is not improved whereby, even when it is adopted as a fibrous base material component for wet frictional material, modulus of elasticity is unable to be maintained at the state of high temperature resulting in a plastic deformation. In a wet frictional material where such a copolymer acrylic fiber is used as a fibrous base material for wet frictional materials, the fiber is deteriorated when used for a long period and, as a result, there is generated a problem that coefficient of friction is unable to be maintained. In addition, in the copolymer acrylic fiber, resistance to acidic decomposition products resulted by additives in the lubricant is low and there is a problem that, when exposed thereto for a long period, deterioration happens and strength of the fibrous base material lowers whereby an object of the present invention is unable to be achieved. On the other hand, in the case of the homoacrylic fiber which is a homopolymer of acrylonitrile adopted in the present invention, resistance to chemicals such as resistance to acid is very high and all of the problems as a result of adoption of the copolymer acrylic fiber can be solved.

With regard to a solvent for spinning a polymer which is a raw material for the homoacrylic fiber and/or the homoacrylic pulp, known ones may be used and, when spinning is carried out by an organic solvent represented by DMSO, DMA and DMF, there is a tendency that modulus of elasticity at high temperature and resistance to acid somewhat lower. Accordingly, an inorganic aqueous solvent such as aqueous solution of sodium thiocyanate (hereinafter, referred to as PRS), nitric acid or an aqueous solution of zinc chloride is particularly preferred.

In the homoacrylic fiber and/or the homoacrylic pulp, modulus of elasticity at 180° C. is not less than 10 cN/dtex or, preferably, not less than 13 cN/dtex. Here, the modulus of elasticity at 180° C. means that measurement of modulus of elasticity according to JIS-L-1095 is carried out in a dry and hot box of 180° C. and an inclination at the stage where tensile strength of the fiber is 5% in a chart of the recorded load/ductility is calculated according to the above JIS.

Although temperature of a circulating lubricant having a function of cooling a wet frictional material is about 120° C., temperature of a wet frictional material rises up to about 180° C. due to high efficiency and high mechanism of the recent automatic transmissions. When modulus of elasticity of the homoacrylic fiber and/or the homoacrylic pulp is less than 10 cN/dtex, pores are crushed, stable frictional coefficient is unable to be maintained and, in the worst case, burning happens when the wet frictional material is operated for a long period whereby an object of the present invention cannot be achieved.

In order to achieve the modulus of elasticity at 180° C. for the homoacrylic fiber which is an essential feature of the present invention, it is necessary to rise the degree of crystallization of the fiber. For rising the degree of crystallization of the fiber, it is essential that the polymer used as a starting material is a homopolymer of acrylonitrile and known techniques such as high polymerization of polymer, high concentration of spinning polymer dope, spinning by air gap, dry-heat high drawing after spinning, etc. may be appropriately combined and adopted and, in order to obtain a preferred modulus of elasticity at 180° C., it is necessary to adopt all of such techniques.

Incidentally, there is no particular limitation for molecular weight, concentration of spinning polymer dope and dry-heat draw ratio after spinning provided that the homoacrylic fiber having the characteristics of the present invention can be prepared and, with regard to the molecular weight, an example in terms of weight-average molecular weight (Mw) is 150,000 or more or, preferably, 200,000 or more. Concentration of the spinning polymer dope may be decided by taking molecular weight, type of the solvent, viscosity of the dope, operation stability in the spinning step, etc. into consideration. For the dry-heat draw ratio after spinning, it is also necessary to take dry-heat temperature and operation stability into consideration and, although it cannot be simply decided, an example is 1.6 times or more or, preferably, 2.0 times or more.

It is also necessary that shrinking rate at 200° C. of the homoacrylic fiber and/or the homoacrylic pulp in the present invention is within 5%. For the production of a wet frictional material, a heating treatment at about 200° C. with pressure is applied during a thermosetting process of the fibrous base material of the present invention with a binder such as a thermosetting resin and in a step of core metal adhering process in molding into the final shape and, in the homoacrylic fiber of the present invention, no plastic deformation happens even in a state of such a high temperature. However, when shrinkage of the fiber at 200° C. is more than 5%, the fibrous base material shrinks during the heating process as such resulting in a problem that the size of the wet frictional material does not become constant whereby it is unable to be used as a fibrous base material for wet frictional materials.

Here, measurement of the shrinking rate at 200° C. is done as follows. Thus, for 100 cm which is measured and marked under such a state that a load of 0.1 cN is applied per dtex of fiber flux at room temperature, the length which is measured in such a manner that the material is allowed to stand with a non-loaded state at 200° C. for 10 minutes in a hot-air drier, subjected to natural cooling until room temperature and loaded again in the same manner is defined A (cm) and then calculation is done by the following formula.

Shrinking rate (%)=100−A

With regard to a method for the preparation of fiber having an aimed shrinking rate while the above-mentioned modulus of elasticity at 180° C. is still maintained at 10 cN/dtex or more, an example is a method where the spun homoacrylic fiber is subjected to a heat setting treatment for at least 1 minute at 205° C. or higher under the tensile tension where the size is maintained.

The homoacrylic fiber which is prepared as above may be cut into an appropriate size and used as it is or, as will be mentioned later, it may be used as a homoacrylic pulp. Alternatively, both may be combined and used. The fibrous base material for wet frictional materials according to the present invention comprises a fiber component containing 5 to 50% by weight of the homoacrylic fiber and/or the homoacrylic pulp as such, a friction adjusting material and a filler.

Here, the ratio of the homoacrylic fiber and/or the homoacrylic pulp to the total fiber components of the fibrous base material for wet frictional materials is 5 to 50% by weight. When it is less than 5% by weight, the above-mentioned effect of the homoacrylic fiber and/or the homoacrylic pulp is not significantly noted while, when it is more than 50% by weight, balance to other fiber component is bad and there is a possibility of causing the deterioration of properties as frictional materials whereby that cannot be adopted. With regard to other fiber component to be used for fibrous base material for wet frictional materials, publicly known heat-resistant fiber and pulp may be utilized and, in view of balance between heat resistance and cost, it is usual to use cellulose pulp such a linter pulp together with aramid pulp. Besides the above, it is also possible to use inorganic fiber having good heat resistance such as carbon fiber, glass fiber, potassium titanate fiber, steel fiber and alumina fiber.

Incidentally, although it is usual that the homoacrylic fiber and/or the homoacrylic pulp are/is made into sheet together with the above-mentioned other fiber component or, in some cases, with a friction adjusting material or the like and a fibrous base material is prepared as a base paper, it is also possible that the homoacrylic fiber is subjected to a crimping treatment, the resulting crimp wedding of 8 to 76 mm is made into a nonwoven fabric by a dry nonwoven fabric together with other fiber component or made into a sheet by a textile by spun yarn and the product is used as a fibrous base material for wet frictional materials.

When the fibrous base material is prepared particularly by a method for producing a base paper by making into sheet, there is produced a structure where fiber is mostly aligned in a horizontal direction. However, the wet frictional material prepared from this fibrous base material works by receiving repeated compression in a vertical direction and, therefore, there is a problem that elastic rebound force of fiber hardly works effectively in such a fibrous base material where fiber is aligned in a horizontal direction. Under such circumstances, as a result of investigation on the problem as such, it has been found that, when the homoacrylic fiber is subjected to a crimping process to give a curved homoacrylic short fiber where the fiber is curved and further cut in short, the short fiber is in a three-dimensional structure in the fibrous base material and, therefore, an elastic rebound force of the fiber to surface pressure upon sliding effectively works and, further, a wet frictional material having little deterioration can be prepared.

In a fiber which is subjected to a crimping process, the fiber length is preferably 0.5 to 4 mm which is suitable for achieving the three-dimensional structure in its base paper. When it is shorter than 0.5 mm, detachment of the fiber takes place and, moreover, cost for cutting becomes high and deviation in fiber length by erroneous cutting becomes high as well whereby that is not preferred. When it is longer than 4 mm, it is hardly dispersed in a single fiber in water upon preparation of a base paper but non-dispersed blocks of the fiber are produced and there is a problem that the homogeneity of surface of the fibrous base material is deteriorated whereby that is not preferred. With regard to an apparatus for giving the crimps, the conventional crimping apparatus for the formation of crimps may be used. Although there is no particular limitation for the degree of crimp, it is preferred to be 7 to 13% and 6-13/inch in terms of crimping rate $C_i$ and crimp numbers $C_n$, respectively, which are usually used in wedding for spinning.

When a base paper is adopted as a fibrous base material for forming the wet frictional materials, it is particularly effective to use a pulp fiber having a binder effect for improving the strength of the base paper. As the strength of the base paper is improved, its strength to sliding stress of the wet frictional material also becomes high and durability to crack and damage upon working for a long term is also improved. In addition, the fibrillated pulp fiber effectively works for making the above fibrous base material into a three-dimensional structure as well and, therefore, it is preferred to use a homoacrylic pulp where the homoacrylic fiber is fibrillated as a material having such pulp characteristics in addition to the characteristics of the homoacrylic fiber adopted by the present invention.

The homoacrylic pulp is prepared by fibrillation of the above-mentioned homoacrylic fiber. Although it is possible to utilize a common beating machine for the fibrillation, the homoacrylic fiber is tough and some means are needed for beating. Thus, when a refiner is used, a dispersion where the homoacrylic fiber is cut in 2 to 6 mm and dispersed solely in a concentration of 1 to 4% in water without other fiber is to be used and beating is to be carried out at high electric currency using a beater such as a single refiner where a high shear is applied and using a tooth profile for twisting beating. Freeness which is a yardstick for fibrillation of the homoacrylic pulp can be appropriately adjusted to give pore size and base paper strength suitable for the use adjusting to the balance for other fiber component and friction adjusting material and 260 to 600 ml in terms of Canadian Standard Freeness is preferred in view of the balance between the binder effect and the cost for fibrillation.

Even when an acrylic pulp is used solely, it effectively works to a fundamental durability of a wet frictional material using a fibrous base material comprising the same but, as a result of making into pulp by beating the fiber; its surface area is quite large. Therefore, resistance to chemicals such as acidic decomposition product tends to somewhat lower as compared with the homoacrylic fiber. Now the joint use of the homoacrylic fiber with the homoacrylic pulp in an appropriate ratio is more effective. Thus, when the ratio by weight of the homoacrylic fiber to the homoacrylic pulp is from 50/50 to 10/90, there is prepared a good fibrous base material for wet frictional materials in which resistance to acid of the fibrous base material and strength of the fibrous base material are well balanced.

When a base paper is used as a fibrous base material for wet frictional materials according to the present invention, it is prepared in such a manner that fiber components comprising the homoacrylic fiber and/or the homoacrylic pulp and the above-mentioned other heat-resisting fiber, a friction adjusting material and a filler are dispersed together in water, the resulting slurry is aggregated by an aggregating agent, made into a sheet using a paper machine and the resulting sheet is dried and subjected to molding by punching. The friction adjusting agent and the filler may be added by means of coating or impregnation after the paper making. It is preferred that fiber length of the homoacrylic fiber is 0.5 mm to 4 mm in view of the above-mentioned balance between the cutting cost and dispersibility upon dispersing into water. When a dry nonwoven fabric or woven fabric is made into a fibrous base material, nonwoven fabric or woven fabric is previously prepared using the fiber components and then a friction adjusting agent and other filler are impregnated therein or coated thereon. Incidentally, with regard to the friction adjusting material used here, known ones such as cashew dust, graphite, molybdenum disulfide and aluminum powder may be used. With regard to the filler, barium sulfate, calcium carbonate, magnesium carbonate, diatomaceous earth, etc. may be used.

The fibrous base material of the present invention is very useful for the preparation of a wet frictional material having an excellent durability for a long period. In the preparation of the wet frictional material, a binder represented by a thermosetting resin and the fibrous base material of the present invention are molded by pressure and heat according to the conventional method and, if necessary, metal fittings, etc. are attached thereto. Representative examples of the above-mentioned resin are phenol resin, epoxy resin, melamine resin, imide resin and polyester resin.

EXAMPLES

As hereunder, Examples are shown for making understanding of the present invention easy. They are, however, merely exemplary and the gist of the present invention is not limited thereby. Incidentally, part(s) and percentage are those by weight unless otherwise mentioned.

Preparation of Fiber Samples

According to the conventional method, an acrylonitrile homopolymer was dissolved in a solvent, spun, subjected to a wet-heat drawing (draw ratio: 6 times), subjected to a dry-heat drawing and subjected a heat setting for 3 minutes under a fiber tension to give the homoacrylic fibers of No. 1 to No. 4 of the present invention. Table 1 shows condition for the manufacture of each homoacrylic fiber, primary modulus of elasticity at room temperature, modulus of elasticity at 180° C. and shrinking rate at 200° C. The homoacrylic fiber No. 4 of the present invention is that prepared by a crimping process and its $C_n$ was 10/inch and $C_i$ was 10%. Incidentally, molecular weights of the polymer in the table are weight-average molecular weights. For the sake of comparison, there are similarly shown No. 5 which is a homoacrylic fiber satisfying no essential features of the homoacrylic fiber of the present invention and No. 6 which is a copolymerized acrylic fiber as well. Here, primary modulus of elasticity at room temperature was measured in accordance with JIS-L-1095.9.13 (method for the measurement of initial tensile resistance of fiber).

TABLE 1

| No. | Solvent for Spinning | Monomer Used | Mw (×1000) | Spinning Method | DR upon Dry Heating | Thermosetting Temp | Crimping Treatment | Primary ME at room temp | ME at 180° C. | SR at 200° C. (%) |
|---|---|---|---|---|---|---|---|---|---|---|
| 1 | PRS | 100% AN | 200 | AG | 2.0 | 215° C. | – | 160 | 13 | 3 |
| 2 | PRS | 100% AN | 150 | AG | 1.6 | 205° C. | – | 110 | 11 | 5 |
| 3 | DMSO | 100% AN | 150 | AG | 1.6 | 205° C. | – | 110 | 10 | 5 |
| 4 | PRS | 100% AN | 200 | AG | 2.0 | 215° C. | + | 165 | 13 | 4 |
| 5 | PRS | 100% AN | 120 | Wet method | 1.6 | 170° C. | – | 90 | 3 | 15 |
| 6 | PRS | 3% VAc and 97% AN | 150 | AG | 2.0 | 205° C. | – | 150 | 7 | 5 |

PRS: Aqueous solution of sodium thiocyanate
AN: Acrylonitrile
DMSO: Dimethyl sulfoxide
AG: Air gap method
VAc: Vinyl acetate
–: not carried out
+: carried out
DR: Draw ratio (times)
ME: Modulus of elasticity (unit: cN/dtex)
SR: Shrinking rate Preparation of Homoacrylic Pulp The above homoacrylic fiber No. 1 was cut into 6 mm and a resulting single aqueous slurry of 2% concentration was fibrillated by a refiner (details: Superfibrator 600A manufactured by Hasegawa Tekko was equipped with profile of type 611S and used to beat with electric current of 80 Amp at 440 volts; adjustment of the freeness was conducted by adjusting the passing numbers of the refiner) to give a homoacrylic pulp as shown in Table 2. Freeness was measured according to JIS-P-8121 in accordance with the Canadian Standard Freeness. For comparison, designed freeness (catalog data) is also shown for No.3 and No.4 which are CFFV 125 and CFFV 110, respectively, manufactured by Sterling which are acrylic pulps from a copolymerized acrylic fiber.

TABLE 2

| No. | Acrylic Fiber Used | Freeness (CSF) |
|---|---|---|
| 1 | Homoacrylic fiber No. 1 in Table 1 | 600 ml |
| 2 | (same as above) | 260 ml |
| 3 | (Commercially available acrylic pulp) | 400 ml |
| 4 | (same as above) | 250 ml |

After that, 60 parts of the homoacrylic fiber together with the homoacrylic pulp and other fiber components, 8 parts of cashew dust and 7 parts of graphite as friction adjusting materials and 15 parts of diatomaceous earth as a filler were mixed and milled using a hand paper machine to prepare a fibrous base material of 1 mm thickness for wet frictional materials. Here, with regard to the other fiber components, linter pulp/aramid pulp/potassium titanate fiber/carbon fiber in a ratio of 50/40/5/5 by weight were used. Table 3 shows Nos. of the homoacrylic fiber (A) and the homoacrylic pulp (B) used for the fibrous base material, compounding ratio of A and B to the total fiber components and ratio of A to B. For comparison, acrylic fiber and acrylic pulp which are out of the scope of the present invention are also shown similarly.

The fibrous base material was cut into 2 cm width and 20 cm length and the resulting test piece was subjected to a measurement according to JIS-L-1096-A where grasping length was 15 cm (in a longitudinal direction) and tensile speed was 10 cm/minute using a Tensilon measuring machine and the result was adopted as the strength of the fibrous base material. Further, with regard to the test for resistance to acid, a test piece in the same size was dipped in 35% diluted sulfuric acid, pulled out, air-dried as it was and then subjected to repeated compression and release every 5 seconds using a press molding machine (type M-2 manufactured by Shinto) at hot plate temperature of 180° C. and surface pressure of 100 kg/cm$^2$. After repeating for 100,000 times, the same measurement as that in the above-mentioned strength for the fibrous base material was carried out and percentage to the strength of the fibrous base material in the initial stage (before the test for resistance to acid) was adopted as a retention rate of strength after the test for resistance to acid. At the same time, thickness of the test piece was measured and a reduction from the thickness of the fibrous base material in the initial stage was adopted as the deteriorated amount after the test for resistance to acid. Incidentally, measurement of thickness was conducted at random five places of the test piece followed by averaging. With regard to evaluation of the shrinking rate upon heating, a test piece cut into a size of 20 cm width and 20 cm length was heated for 10 minutes by a hot-air drier of 200° C. and subjected to natural cooling, longitudinal and vertical sizes were measured and shrunk area to the initial area was expressed in terms of percent. Table 3 shows strength, retention rate of strength after the test for resistance to acid and shrinking rate upon heating of the fibrous base material.

TABLE 3

|   | No. | Acrylic Fiber A No. in Table 1 | Acrylic Fiber A Cut length (mm) | Acrylic Pulp B (No. in Table 2) | A/B | Rate of (A + B) in Total Fiber Component | Strength of FBM (kgf) | After Acid-Resisting Test Retention Rate of Strength (%) | After Acid-Resisting Test Deteriorated Amount (%) | Shrinking Rate of FBM upon Heating (%) |
|---|---|---|---|---|---|---|---|---|---|---|
| Ex. | 1 | 1 | 1 | 1 | 30/70 | 30 | 0.82 | 45 | 10 | 6 |
|  | 2 | 2 | 1 | 1 | 30/70 | 30 | 0.81 | 43 | 12 | 6 |
|  | 3 | 1 | 1 | 1 | 10/90 | 30 | 1.05 | 44 | 13 | 6 |
|  | 4 | — | — | 1 | 0/100 | 5 | 1.02 | 37 | 19 | 6 |
|  | 5 | 2 | 1 | — | 100/0 | 50 | 0.65 | 34 | 14 | 10 |
|  | 6 | 4 | 1 | 2 | 30/70 | 30 | 0.87 | 50 | 6 | 6 |
|  | 7 | 4 | 4 | 2 | 30/70 | 30 | 0.89 | 51 | 7 | 6 |
|  | 8 | 4 | 0.5 | 2 | 30/70 | 30 | 0.85 | 49 | 7 | 6 |
|  | 9 | 3 | 1 | 1 | 50/50 | 30 | 0.81 | 40 | 18 | 6 |
| CE | 10 | 5 | 1 | 3 | 30/70 | 30 | 0.80 | 18 | 30 | 28 |
|  | 11 | 6 | 1 | 4 | 30/70 | 30 | 0.82 | * | * | 12 |

CE: Comparative Example
FBM: Fibrous basic material
*: Test pieces was broken and measurement was impossible In the fibrous base materials (No. 1 to No. 9 in Table 3) in which the homoacrylic fiber (No. 1 to No. 4 in Table 1) and the homoacrylic pulp (No. 1 and No. 2 in Table 2) meeting the requirements of the present invention were used in 5% to 50% of the fiber components, shrinkage upon heating was small and both retention rate of strength and deteriorated amount after the test for resistance to acid showed good data. The above constitutes a base for the facts that there is little problem in adhesion of core metal upon preparation of a wet frictional material and that, when used as a wet frictional material, durability was high and stable friction characteristic was achieved. On the contrary, in the product (Comparative Example No. 10 in Tale 3) where the homoacrylic fiber having high shrinkage upon heating at 200° C. (No. 5 in Table 1) was used, shrinking rate of a fibrous base material upon heating was high and there is estimated a problem of detachment from a core metal by shrinking upon molding of a wet frictional material and, in the product (Comparative Example No. 11 in Table 3) where the acrylic fiber (No. 6 in Table 1) which is a copolymer was used, there was found a problem in durability that deterioration in the test for resistance to acid was big and the test piece was broken during the test.

As compared with Examples No. 1 to No. 3 and No. 6 to No. 9 where the homoacrylic fiber and the homoacrylic pulp were used together, Example No. 4 where only homoacrylic pulp was used showed a bit of a big deteriorated amount after the test for resistance to acid while, in Example No. 5 where only homoacrylic fiber was used, strength of the fibrous base material and retention rate of strength after the test for resistance to acid considerably lowered whereupon it is noted that the joint use of the homoacrylic fiber and the homoacrylic pulp is preferred. In Example 1 where the homoacrylic fiber (No. 1 in Table 1) having a preferred modulus of elasticity at 180° C. was used, deteriorated amount after the test for resistance to acid was far less resulting in a good data as compared with Example 2 but, in Examples No. 6 to No. 8 where a curved homoacrylic short fiber having preferred modulus of elasticity at 180° C., deteriorated amount was still lower and retention rate of strength was also high showing an excellent durability whereupon it is noted that there are prepared excellent fibrous base materials for wet frictional materials showing a good balance to strength of the fibrous base material.

In Example No. 9, there was used the homoacrylic fiber which was spun using DMSO which is an organic solvent. As compared with Example No. 2 (where there was used the homoacrylic fiber which was spun using PRS which is an inorganic aqueous solvent) having the same fibrous basic material composition except the homoacrylic fiber, there was noted a tendency that deteriorated amount after the test for resistance to acid increased and retention rate of strength also lowered. Incidentally, in the Examples, strength of fibrous base material of No. 4 is high and that will be due to the fact that pulp components such as linter pulp and aramid pulp increased as a whole in addition to the homoacrylic pulp.

The invention claimed is:

1. A fibrous base material to be subjected, together with a thermosetting resin as a binder, to the preparation of wet frictional materials, wherein the fibrous base material does not comprise organic synthetic soluble polymer particles, wherein the fibrous base material comprises a fiber component, a friction adjusting material and a filler, wherein the fiber component comprises 5 to 50% by weight of a homoacrylonitrile fiber and/or a homoacrylonitrile fiber in a pulp form, wherein a modulus of elasticity of the homoacrylonitrile fiber at 180° C. is not less than 10 cN/dtex, and a shrinking rate at 200° C. is 0 to 5%, and wherein the homoacrylonitrile fiber in a pulp form is prepared by fibrillation of said homoacrylonitrile fiber.

2. The fibrous base material for wet frictional materials according to claim 1, wherein a ratio by weight of the homoacrylonitrile fiber to the homoacrylonitrile fiber in a pulp form is from 50/50 to 10/90.

3. The fibrous base material for wet frictional materials according to claim 1, wherein the homoacrylonitrile fiber is a fiber which is subjected to a crimping treatment, followed by cutting into a fiber length of 0.5 to 4 mm.

4. The fibrous base material for wet frictional materials according to claim 2, wherein the homoacrylonitrile fiber is a fiber which is subjected to a crimping treatment, followed by cutting into a fiber length of 0.5 to 4 mm.

* * * * *